US005730308A

United States Patent [19]
Koether et al.

[11] Patent Number: 5,730,308
[45] Date of Patent: Mar. 24, 1998

[54] ANTI-CONDENSATION COVER FOR PRESSURE FRYER

[75] Inventors: Bernard G. Koether, Tequesta, Fla.; Francis J. McGinn, Branford; William D. Motherway, Easton, both of Conn.

[73] Assignee: Technology Licensing Corporation, Tequesta, Fla.

[21] Appl. No.: 172,624

[22] Filed: Dec. 22, 1993

[51] Int. Cl.$^6$ .................................................. B65D 55/00
[52] U.S. Cl. .................... 220/201; 220/254; 220/912
[58] Field of Search ................................ 220/201, 254, 220/316, 912; 126/381, 382, 384; 236/56, 59

[56] References Cited

U.S. PATENT DOCUMENTS

| | | | |
|---|---|---|---|
| 2,225,448 | 12/1940 | Hamilton | 220/298 |
| 2,399,115 | 4/1946 | Hansen et al. | 220/298 |
| 2,428,894 | 10/1947 | Serio | 220/44 |
| 2,516,202 | 7/1950 | Graham | 220/201 |
| 2,614,723 | 10/1952 | Welden | 220/298 |
| 2,660,330 | 11/1953 | Keller | 220/298 |
| 3,209,746 | 10/1965 | Giuseppe | 126/381 |
| 3,368,710 | 2/1968 | King | 220/44 |
| 3,964,637 | 6/1976 | Luebke et al. | 220/314 |
| 3,976,218 | 8/1976 | Stoermer | 220/316 |
| 4,148,250 | 4/1979 | Miki et al. | 99/403 |
| 4,273,991 | 6/1981 | Barnhill | 219/440 |
| 4,298,131 | 11/1981 | Saito et al. | 220/231 |
| 4,469,237 | 9/1984 | Zerdian et al. | 220/209 |
| 4,478,349 | 10/1984 | Haverlaud, Jr. et al. | 220/410 |
| 4,530,440 | 7/1985 | Leong | 220/201 |
| 4,626,557 | 12/1986 | Duska et al. | 220/458 X |
| 4,834,247 | 5/1989 | Oshima et al. | 220/359 X |
| 4,840,287 | 6/1989 | Brewer et al. | 220/316 |
| 4,995,312 | 2/1991 | Leiros | 99/411 |
| 4,997,101 | 3/1991 | King et al. | 220/318 |
| 5,029,519 | 7/1991 | Boyen | 99/341 |
| 5,042,677 | 8/1991 | Chen et al. | 220/201 |
| 5,229,563 | 7/1993 | Isogai et al. | 220/203 X |

FOREIGN PATENT DOCUMENTS

| | | |
|---|---|---|
| 142951 | 12/1949 | Australia . |
| 490769 | 2/1953 | Canada . |
| 2243110 | 9/1990 | Japan . |
| 1517929 | 10/1989 | U.S.S.R. . |
| 1687251 | 10/1991 | U.S.S.R. . |

*Primary Examiner*—Allan N. Shoap
*Assistant Examiner*—Robin A. Hylton
*Attorney, Agent, or Firm*—Pennie & Edmonds

[57] ABSTRACT

A closure for covering the opening of a vessel containing a supply of cooking fluid preferably includes a flexible inner member adapted to cover the opening of the vessel in sealing engagement therewith and an outer member adapted to be positioned above the inner member. A coupling assembly is provided to couple the inner member to the outer member when the closure assembly is removed from the vessel. The coupling assembly permits a portion of the inner member to expand away from the outer member in response to an increase in temperature within the cooking vessel. The inner member is preferably a low thermal conductivity material so that after the inner surface of the inner member, which is exposed to vaporized cooking fluid, reaches the temperature of the vapor condensing thereon, the rate of additional condensation is substantially reduced. The vapor conserved by reduced condensation on the inner surface is used to generate pressure in the vessel more rapidly. The inner member is also preferably selected from a material exhibiting a highly non-linear thermal gradient in response to elevated temperatures.

11 Claims, 3 Drawing Sheets

ANTI-CONDENSATION COVER FOR PRESSURE FRYER

BACKGROUND OF THE INVENTION

The present invention relates to cooking and, more particularly, to a cover for pressure fryers or other pressurized cooking vessels.

Pressure frying devices are widely used commercially to quickly prepare large quantities of foods such as chicken, shrimp, and fish fillets and typically include a vessel adapted to receive and hold a quantity of cooking oil in which food to be cooked is immersed. The food is generally supported in a basket which is introduced into the cooking vessel, and a cover for the vessel is then closed and latched to seal the opening during the cooking operation. The cooking takes place under pressure to minimize oil absorption and to reduce cooking time.

The pressure cooker lid must be designed to allow access to the interior of the pressure vessel and to be sealed upon closure of the vessel. Many pressure lid designs also incorporate a safety feature such as a locking mechanism to prevent removal of the lid when the pressure within the vessel is above a predetermined level. For example, as taught in U.S. Pat. No. 3,976,218, a lid may be provided with a flexible metallic liner covering its inner surface, the liner serving in part as a diaphragm which engages a pin projecting through an opening in the lid. When the pressure within the receptacle exceeds a predetermined level, the flexible liner forces the pin upwardly for engagement with a locking collar forming a part of the spindle utilized to exert sealing pressure against the lid.

With the flexible liner disclosed in the '218 patent the chamber formed between the flexible liner and the upper lid member is intended to partially insulate the flexible liner from atmospheric cooling. Thus, after the liner reaches the temperature of the cooking oil vapor condensing thereon, the rate of additional condensation is said to be reduced. Conservation of vapor on the surface of the lid, in turn, permits pressure to be generated in the pot more rapidly.

While the lid arrangement described above provides some improvement in the rate of pressurization, it is nonetheless subject to certain disadvantages. Among these is the fact that cyclic expansion and contraction of the diaphragm tends to damage the seal between the diaphragm and upper lid. As a result, vapor escapes into the insulating chamber so that energy efficiency and vapor conservation are substantially reduced.

Another disadvantage of lids utilizing metallic liners is the heat loss due to radiation between the liner and the upper lid member. It should be readily understood that any cooling of the liner caused by such heat loss must be offset by additional vapor condensation, which in turn reduces the quantity of steam available for pressure generation within the cooking vessel.

Yet another disadvantage of metallic liners utilized in conventional pressure cooker lids is the cumulative effect of stress on the safe-life of the lid. Increased pressure within the cooking vessel bends the '218 liner upward in a convex manner, as is necessary to operate the locking mechanism. Thermal expansion of the liner induces additional stresses. The cyclical application of these stresses result in a decrease in the safe life of the liner.

There is thus a need in the art for a simple yet highly efficient lid or closure assembly which minimizes the amount of energy required to raise the temperature of the liner and, at the same time, limits the effect of internal stresses on the safe-life of the lid.

SUMMARY OF THE INVENTION

It is therefore an object of the invention to provide a closure for a pressurized cooking vessel which minimizes the amount of energy required to raise the internal pressure to the cooking level.

It is a further object of the invention to accomplish the above with a simple and efficient construction that is relatively inexpensive and easy to maintain.

These objects are realized and other advantages achieved according to the present invention with a closure comprising a member configured and dimensioned to be inserted into the open top of a cooking vessel and to seal against the side walls of the vessel. The member has a predetermined thickness and an inside surface which is adapted to be subjected to elevated cooking temperature and pressure. The member also has excellent insulating properties, exhibiting a low thermal conductivity and a highly non-linear thermal gradient through its thickness in response to the cooking heat applied inside the vessel. The non-linear thermal gradient causes a first relatively thin portion of the thickness of the member adjacent to the inside surface to quickly heat up to the cooking temperature, while a second relatively thicker portion of the member (which thicker portion is spaced away from the inside surface by the thin portion) remains at a relatively low temperature such that the member curves convexly in the direction of the inside surface. The member remains in sealing contact with the vessel when so curved.

According to a further preferred embodiment of the invention, the above described member comprises the inner member of a closure assembly. The assembly further includes an outer member positioned above the inner member. The outer member is also configured and dimensioned to be received within the vessel opening and to seal against the vessel side walls. Means are provided for coupling the inner and outer members together while allowing for relative movement between the members to accommodate the convex curvature of the inner member. The downward convex curvature of the inner member results in a highly stable configuration for the inner member and forms an enlarged space between the inner and outer members. The low thermal conductivity of the inner member effectively insulates the inner surface of the inner member from atmospheric cooling so that after the inner surface of the inner member, which is exposed to vaporized cooking fluid, reaches the temperature of the vapor condensing thereon, the rate of additional condensation is substantially reduced. The vapor conserved by the reduced condensation on the inner surface can be utilized to generate pressure in the vessel more rapidly.

In a further preferred embodiment, the inner member is constructed of a single thermoplastic polymer material which exhibits the low thermal conductivity and non-linear thermal gradient. One suitable material is polysulfone. Alternatively, the inner member may be a composite construction of at least two materials exhibiting different thermal properties. Preferably, the coupling means for coupling the inner and outer members is detachable to permit separation of said members. Separation allows for easy cleaning and changing of worn parts.

According to a further embodiment of the present invention, a cooking apparatus is provided comprising a vessel for containing cooking fluid and a closure assembly including inner and outer lid members and coupling means as described above.

DETAILED DESCRIPTION OF THE PREFERRED EMBODIMENTS

Figure 1:
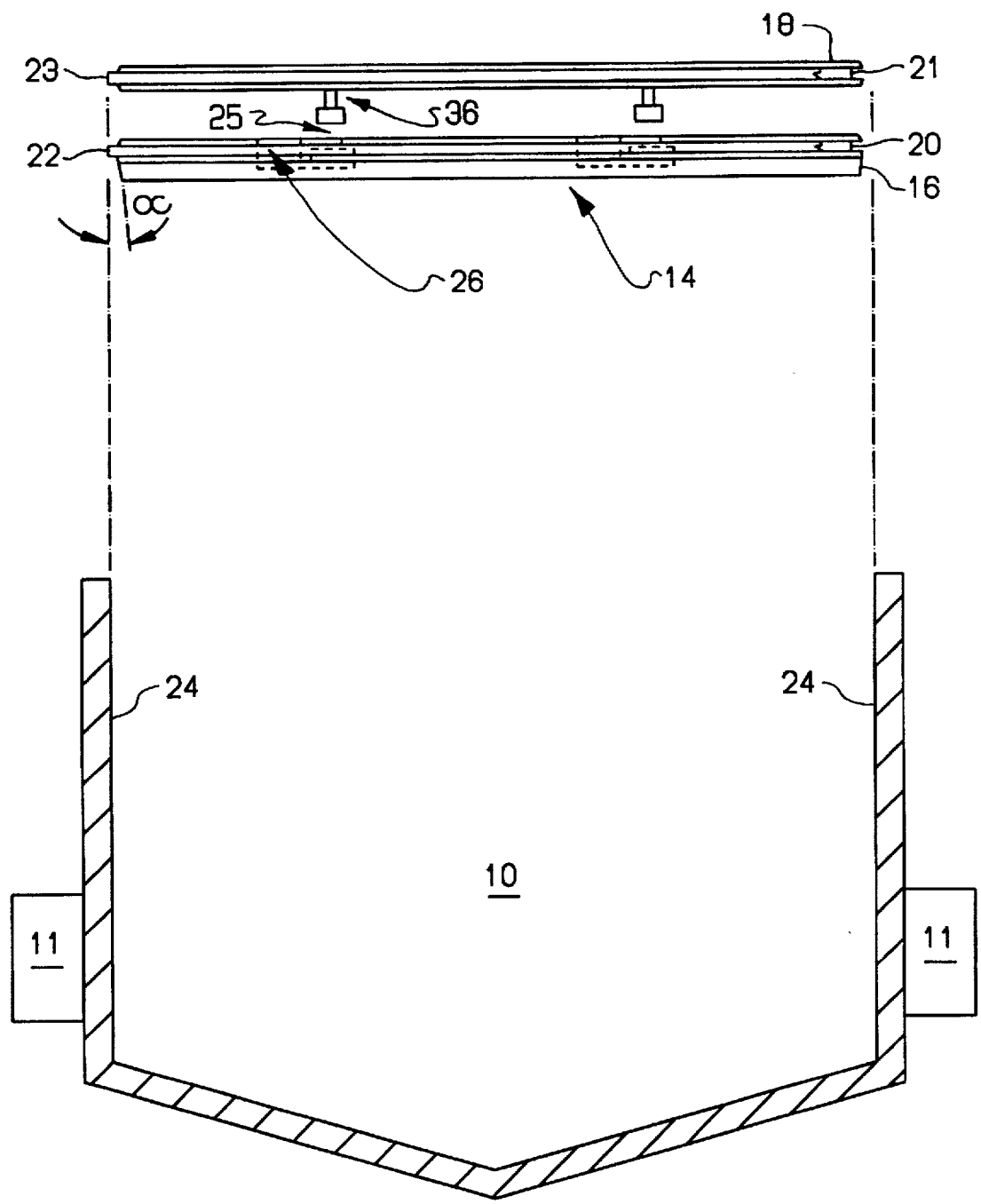
FIG. 1 is a partially sectioned, exploded view of a cooking vat and closure of the present invention.

With reference to FIG. 1, there is shown an embodiment of the invention in which a pressure vessel 10 for containing a cooking fluid such as water or oil has an open top sealed by closure assembly 14. Suitable heating elements 11 are provided. Closure assembly 14 comprises an inner lid member 16 adapted for interlocking engagement with an outer lid member 18. As will be more fully described later, the inner and outer lid members are detachably coupled together and may be easily separated for cleaning. To facilitate a reliable seal under pressure, inner lid member 16 is provided around its periphery with o-ring groove 20 which carries o-ring seal 22. Seal 22 seals against inner wall 24 of vessel 10 when the closure assembly is in place. Likewise, outer lid member 18 has groove 21 which carries seal 23.

In order to minimize the amount of energy required to raise the temperature of the closure assembly, inner lid member 16 preferably has a very low thermal conductivity and moderate heat capacity. Thus, after the inner surface of the inner member, which is exposed to vaporized cooking fluid, reaches the temperature of the vapor condensing thereon, the rate of additional condensation is substantially reduced. The vapor and heat conserved by reduced condensation on the inner surface is used to generate pressure in the vessel more rapidly. The inner lid member is also constructed to allow it to expand convexly downward, which achieves a desirable support condition as explained below.

Figure 4:
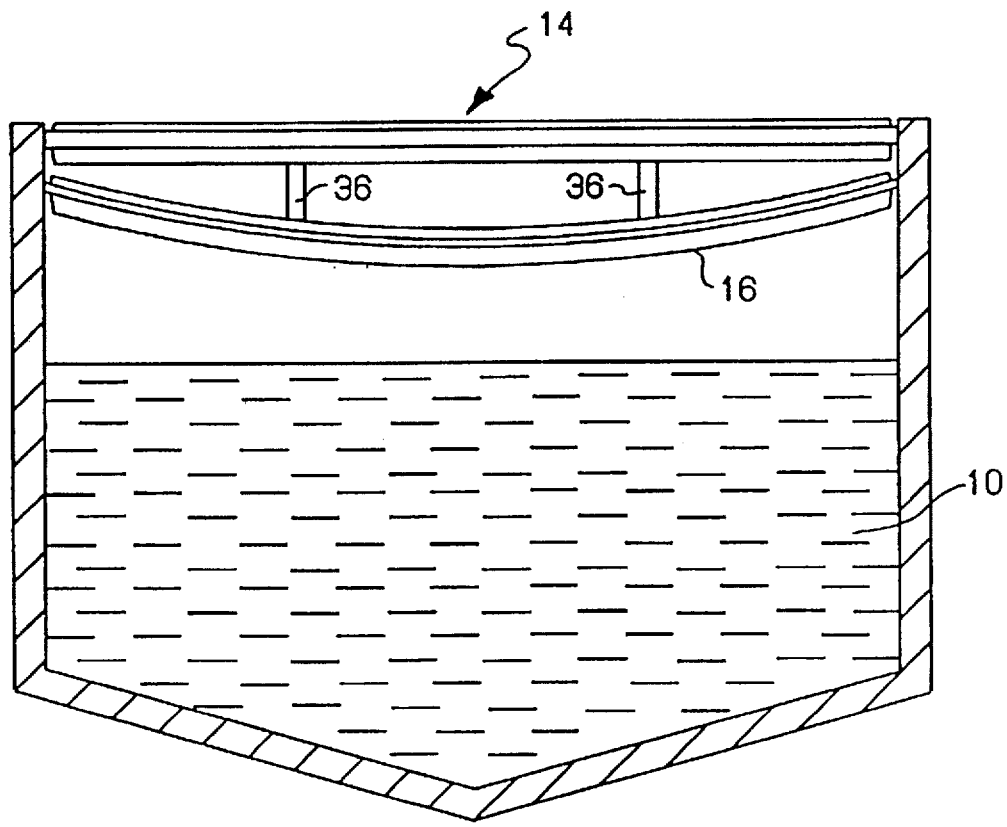
FIG. 4 is a partially sectioned elevation view of the present invention during cooking, with the condition of the inner lid member exaggerated to clearly illustrate the curvature.

According to a preferred embodiment, inner lid member 16 is a single layer of thermoplastic material such as polysulfone. In this embodiment, a slight expansion of the lower surface of the member in response to the increased cooking heat causes the downward convex shape of the member as shown in FIG. 4. In general, member 16 may be constructed of any material or materials possessing the described properties and which are compatible with food preparation at high temperatures.

It is economical to construct the inner lid member from a single low cost material such as a thermoplastic polymer having the desired properties. However, many thermoplastics rapidly degrade upon exposure to the high temperature and pressure within the cooking vessel and the oil vapors present therein. Degradation is facilitated by the penetration of cooking oil into the material under the cooking pressure. Penetration is in turn facilitated by excessive tensile stresses in the outer surface of the material which, in effect, "opens" the material and reduce its resistance to pressurized oil vapor, as well as to heat and oxidation.

The configuration of the present invention allows these problems to be overcome. By utilizing a material such as polysulfone or other thermoplastic polymers, the low thermal conductivity and non-linear thermal gradient allows only a relatively thin section of the material adjacent to the heated surface to heat up rapidly to the vapor temperature. The balance of the thickness of the material remains relatively cool. This provides at least two advantages of the present invention: First, the temperature and pressure within the vessel are quickly raised to the required levels for cooking because there is minimal heat wasted in bringing the closure assembly up to the cooking temperature. Second, tensile stresses, which would open the material, are reduced or eliminated in the thin section of material on the heated and exposed side of the inner lid member because of the resistance to expansion by the substantially thicker and cooler inside portion of the inner lid member. Additionally, the internal pressure of the vessel, which acts against the downwardly bent inner lid, tends to increase compressive stresses in the heated and exposed inner lid surface portion. The resulting compressive stress in the exposed inner surface of the lid member reduces penetration of oil vapors and their ability to degrade the inner lid member. These benefits are achieved by allowing the inner member to deflect as shown in FIG. 4. Thus, the closure assembly must be designed to accommodate the deflection.

Inner lid member 16 is preferably provided with a chamfered lower edge in order to allow clearance for the edge when the member expands and curves in use as shown in FIG. 4. Referring to FIG. 1, the chamfer is represented by angle α and is preferably about 10°.

Although inner lid member 16 alone would be sufficient to seal the vessel, it deflects in such a way as to be disconcerting to the user. Therefore, outer lid 18 serves both to obscure the deflection of inner lid member 16 and to act as a further back-up to the escape of steam pressure in the unlikely event of a seal failure between inner lid member 16 and cooking vessel 10. In the more preferred configuration the downward reaction force on the inner lid member is provided by the outer lid member through line contact at or near the corners of the deflected inner lid member. This support condition enhances the compressive stresses in the inner member inner surface.

Figure 2:
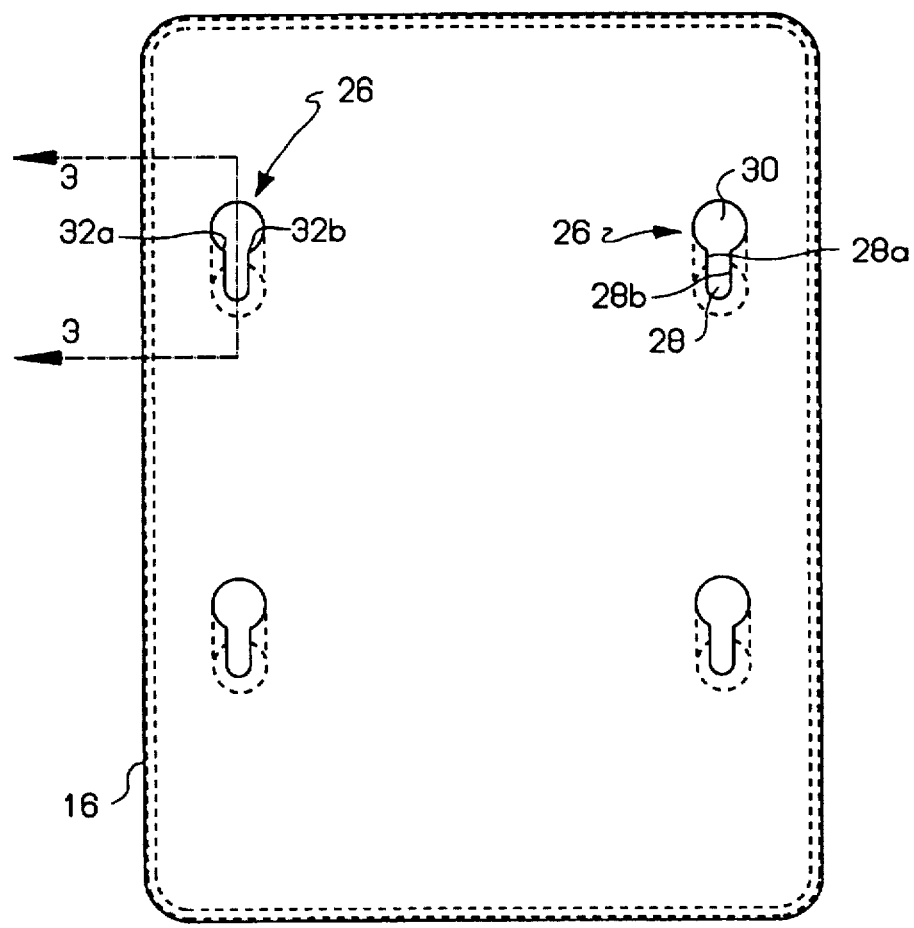
FIG. 2 is a top plan view of the inner lid member shown in FIG. 1.
Figure 3:
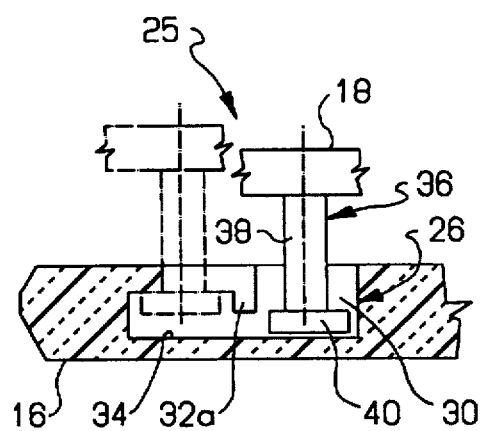
FIG. 3 is a fragmentary sectional view of a portion of the embodiment of FIG. 1.

As indicated above, the inner and outer lid members are detachably coupled together. Preferably the lid members are coupled in such a way as to permit easy separation for cleaning and maintenance. It is also preferred that the coupling prevent excessive relative motion between the lid members when the lid is raised, without restraining thermal expansion or introducing undesirable stresses when in use. As shown in FIGS. 2 and 3, coupling means 25 comprises a plurality of cavities 26 in inner lid member 16 and a plurality of interlocking projections 36 extending downwardly from outer lid member 18. Each cavity 26 includes a slot section 28, having sidewalls 28a and 28b, and an aperture section 30. A pair of spaced abutments 32a and 32b are positioned on opposite sides of slot section 28 at the interface with aperture section 30. Abutments 32a and 32b project downwardly towards the lower wall 34 of the cavity.

Each projecting member 36 comprises a shaft 38 and a mushroom-like head 40. Head 40 is sized to be freely inserted into aperture section 30 of cavity 26, but is large enough to not pass between sidewalls 28a and 28b of slot section 28. Shaft 38 has a diameter sufficient to freely slide within slot section 28. FIG. 3 shows the inner and outer lid members in two stages of assembly, prior to placement on pressure vessel 10. As shown in solid lines in FIG. 3, projecting member 36 is inserted into aperture section 30 a sufficient distance to allow head 40 to clear abutments 32a and 32b. Inner lid member 16 is then slid sideways (to the right in FIG. 3) such that shaft 38 passes between abutments 32a and 32b and into slot section 28. Inner lid member 16 may then be released with the projecting member secured in slot section 28 by virtue of head 40 retained behind abutments 32a and 32b as shown in phantom lines in FIG. 3.

As closure assembly 14 is lowered into pressure vessel 10, the inner and outer lid members are forced together due to the contact of seal 22 with inner wall 24. Head 40 of projection 36 may be forced to a position below the abutments 32a and 32b. However, because the inner and outer members are restrained by the sides of the pressure vessel relative lateral movement cannot occur and they do not become disengaged.

As the temperature inside cooking vessel 10 increases, the bottom surface of lid member 16 heats and expands slightly while the remainder remains relatively cool as explained above. As shown in FIG. 4, lid member 16 is designed to expand into a downwardly convex position so that its center moves away from upper lid member 18. The curvature of lid member 16 is exaggerated in FIG. 4 to clearly illustrate the effect. In the heated condition, inner lid member 16 is supported by the upper lid at various places around the edges, typically only in the corner regions. Due to mushroom-like heads 40 being driven down into cavities 26 when the closure assembly is sealed, there is room for the inner lid member to move downward away from heads 40 to allow the inner lid member to take the curved configuration shown in FIG. 4. This is a highly desirable support condition because, as discussed above, the internal pressure in the cooking vessel will induce compressive bending stresses in the heated outer/lower section of the inner lid member, thereby resulting in an above average safe-life (i.e. reduced degradation) for this type of environment.

As heat and steam pressure build up within the vessel, the low thermal conductivity and moderate heat capacity of inner lid member 16 cause the surface in contact with the steam to rise in temperature very rapidly, until it has reached the temperature of the steam condensing thereon. Accordingly, more steam can be used to build pressure in the cooking vessel rather than to heat the lid. It should be readily apparent that as the resulting higher pressure leads in turn to a higher temperature within the vessel, only a small amount of the heat carried by the steam is required to incrementally raise the temperature of the inner lid member. Thus, the inner lid member of the present invention allows the pressure to build more rapidly in the cooking vessel by greatly reducing or eliminating the heat transfer losses associated with other closure designs.

Figure 5:
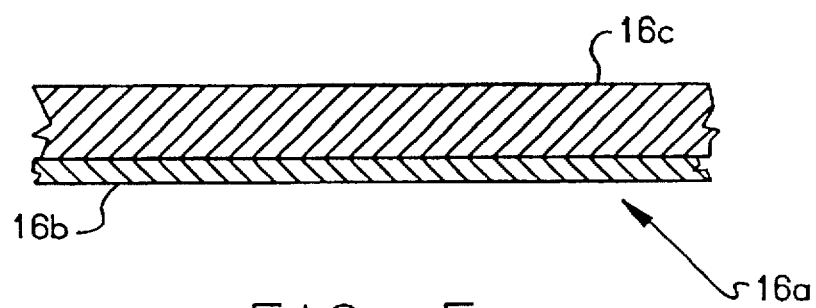
FIG. 5 is a cross-section of a composite inner lid member according to an alternative embodiment of the invention.

The illustrated and described preferred embodiment of the invention is of course subject to numerous variations and modifications without departing from the spirit of the invention. For example, other coupling arrangements may be utilized to prevent the inner and outer lid members from separating upon removal from the top opening in the cooking vessel. If desired, for example, these parts may be permanently affixed to each other so long as the attachment allowed for deflection of the inner member as described herein. A further variation is illustrated in FIG. 5 wherein a composite construction is utilized to achieve an overall low thermal conductivity and non-linear thermal gradient throughout inner lid member 16a. Inner portion 16b, having higher thermal conductivity and expansion properties, is joined outer portion 16c, which serves as an insulator. Persons of ordinary skill in the art can select the appropriate combination of materials and joining techniques based on the teachings of the present invention.

For clarity of description, certain relative directional terms, such as up and down, raise and lower, above and below, and side to side, are used herein with reference to the orientation of the invention as shown in FIGS. 1 and 4. These terms are used only to simplify the description of an exemplary embodiment of the invention and are not to be taken as limiting the invention to a particular orientation. Based on the teachings contained herein, a person of ordinary skill in the art could utilize the present invention in any orientation required for a particular application.

What is claimed is:

1. A closure for an open top cooking vessel, wherein said vessel includes a plurality of opposed side walls which define the open top, said closure comprising:

a member having a periphery configured and dimensioned to be inserted into said open top and seal against said sidewalls around its periphery, said member having a predetermined thickness and an inside surface adapted to be subjected to elevated cooking temperatures, said member having a low thermal conductivity and exhibiting a non-linear thermal gradient through its thickness such that, when subjected to cooking temperatures within said vessel, a first relatively thin portion of said thickness adjacent to the inside surface heats up to the cooking temperature relatively quickly while a second relatively thicker portion of said thickness spaced away from the inside surface by said thin portion remains at a relatively lower temperature such that said member curves convexly in the direction of the inside surface and remains in sealing contact with the side walls when subjected to cooking temperatures within the vessel.

2. The closure according to claim 1, wherein the inside surface of said member is in compression when subjected to the elevated cooking temperature in the vessel.

3. The closure according to claim 1, wherein said member includes seal means disposed around the periphery of said member for sealing against the vessel sidewalls.

4. The closure according to claim 3, wherein said seal means comprises a groove around the periphery of said member and an o-ring seal disposed in said groove.

5. The closure according to claim 1, wherein said member is constructed of a single thermoplastic material exhibiting said low thermal conductivity and non-linear thermal gradient.

6. The closure according to claim 5, wherein said material is polysulfone.

7. The closure according to claim 1, wherein said member comprises a composite construction of at least two materials having different thermal properties.

8. The closure according to claim 1, wherein said member comprises an inner member of a closure assembly, said assembly also comprising:

an outer member positioned above said inner member, said outer member being configured and dimensioned to be received within the vessel open top and seal against said sidewalls; and means for coupling together said inner and outer members, said coupling means permitting relative movement between said members to allow said convex curvature to form an enlarged space between said members in response to exposure of the inner member to cooking temperatures.

9. The closure according to claim 8, wherein said coupling means are detachable to permit separation of said inner and outer members.

10. The closure according to claim 9, wherein said coupling means comprises:

a plurality of mushroom-like projections, projecting from the outer member toward the inner member, said projections having a shaft portion and a larger head portion; and a plurality of apertures defined in the inner member, said apertures configured and dimensioned to receive said projections such that relative sliding movement between said members retains the projection heads behind locking abutments which restrain side-to-side motion but not up and down motion as between said members.

11. A closure for a pressure cooking vessel having a top opening and defining a cooking space, said closure comprising:

an inner member adapted to seal the top opening of said vessel and having an inner surface communicating with said cooking space, said inner member constructed of an insulating thermoplastic material exhibiting a non-linear thermal gradient when subjected to elevated cooking temperatures such that it deflects with its central portion moving inward and develops compressive stresses in its inner surface to resist penetration of degradation by vaporized cooking fluids at said elevated temperatures;

an outer member positioned above said inner member in sealing engagement with said vessel; and means for removably coupling said inner member to said outer member while providing for relative movement between said inner and outer members to allow said deflection of the inner member away from the outer member in the central portion in response to the elevated cooking temperatures in said vessel.

* * * * *